US012589694B1

(12) United States Patent
Browning

(10) Patent No.: US 12,589,694 B1
(45) Date of Patent: Mar. 31, 2026

(54) EXTERIOR VEHICLE MIRROR WITH LOGO

(71) Applicant: John Browning, Charlestown, RI (US)

(72) Inventor: John Browning, Charlestown, RI (US)

( * ) Notice: Subject to any disclaimer, the term of this patent is extended or adjusted under 35 U.S.C. 154(b) by 372 days.

(21) Appl. No.: 18/133,313

(22) Filed: Apr. 11, 2023

(51) Int. Cl.
*B60R 1/12* (2006.01)
*B60R 1/00* (2022.01)

(52) U.S. Cl.
CPC ............ *B60R 1/1207* (2013.01); *B60R 1/006* (2013.01); *B60R 2001/1215* (2013.01)

(58) Field of Classification Search
CPC .................. B60R 1/006; B60R 1/1207; B60R 2001/1215
USPC ................................... 359/838, 871; 362/494
See application file for complete search history.

(56) References Cited

U.S. PATENT DOCUMENTS

| | | | | |
|---|---|---|---|---|
| 1,465,950 | A * | 8/1923 | Schiller | B60Q 1/34 362/540 |
| 5,124,845 | A * | 6/1992 | Shimojo | B60Q 1/2665 362/135 |
| 6,178,677 | B1 * | 1/2001 | Williams | B60Q 1/503 340/902 |
| 6,220,737 | B1 * | 4/2001 | Baragona | B60Q 1/0483 362/540 |
| 6,467,918 | B2 | 10/2002 | Strode et al. | |
| 6,870,655 | B1 * | 3/2005 | Northman | B60R 21/01566 359/603 |
| 6,932,497 | B1 * | 8/2005 | Huang | B60R 1/1207 362/540 |
| 6,941,690 | B2 | 9/2005 | McCambley, Jr. | |
| 11,052,826 | B2 * | 7/2021 | Huizen | F21S 43/237 |
| 2001/0055214 | A1 * | 12/2001 | Chang | B60R 1/06 362/135 |
| 2003/0053226 | A1 * | 3/2003 | Strode | B60R 1/12 359/838 |
| 2003/0086191 | A1 * | 5/2003 | Nielsen | B60N 2/879 359/877 |
| 2004/0022065 | A1 * | 2/2004 | Assinder | B60R 1/1207 362/494 |
| 2012/0154911 | A1 * | 6/2012 | Huynh | B60J 11/06 359/511 |
| 2014/0320823 | A1 * | 10/2014 | Ammar | B60Q 1/0023 353/13 |
| 2015/0224919 | A1 * | 8/2015 | Sobecki | B60Q 3/12 29/407.01 |
| 2019/0270403 | A1 * | 9/2019 | Sobecki | G03B 21/2033 |

* cited by examiner

*Primary Examiner* — Ricky D Shafer

(57) ABSTRACT

An exterior vehicle mirror attachment with logo including an enclosure assembly and an indicia assembly. The enclosure assembly includes an enclosure which can be adapted to the side mirror of a car. The indicia assembly includes a sign member and lights. The indicia member includes an emblem or a logo. The indicia assembly is attached to the enclosure and is illuminated to blink or remain turned on through the lights. The lights are within the sign member.

10 Claims, 3 Drawing Sheets

EXTERIOR VEHICLE MIRROR WITH LOGO

BACKGROUND OF THE INVENTION

1. Field of the Invention

The present invention relates to an exterior vehicle mirror attachment with logo and, more particularly, to an exterior vehicle mirror with logo that allows attaching a device which turns on a light to show a logo in the mirror sides of a vehicle and indicate presence of a vehicle.

2. Description of the Related Art

Several designs for exterior vehicle mirror attachments have been designed in the past. None of them, however, include an attachment member to attach the present invention to a side mirror of a vehicle.

Applicant believes that a related reference corresponds to U.S. Pat. No. 6,467,918 issued for an indicia display that clips onto the exterior rearview mirror of a vehicle. Applicant believes that another related reference corresponds to U.S. Pat. No. 6,941,690 issued for a stretchable covering for a vehicle side view mirror which is intended to have indicia printed there upon. None of these references, however, teach of an exterior mirror attachment for a vehicle having an integral illuminated symbol, insignia, logo, or indicia on the non-reflective, front-facing surface of the mirror housing.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an exterior vehicle mirror attachment with logo that includes an adhesive portion which reinforces the attachment of the present invention to a side mirror.

It is another object of this invention to provide an exterior vehicle mirror attachment with logo that includes an illuminated indicia portion to illuminate a logo, or emblem shown in the present invention.

It is still another object of the present invention to provide a an exterior vehicle mirror attachment with logo that includes an attachment adapted to the shape of the side mirror of a car.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
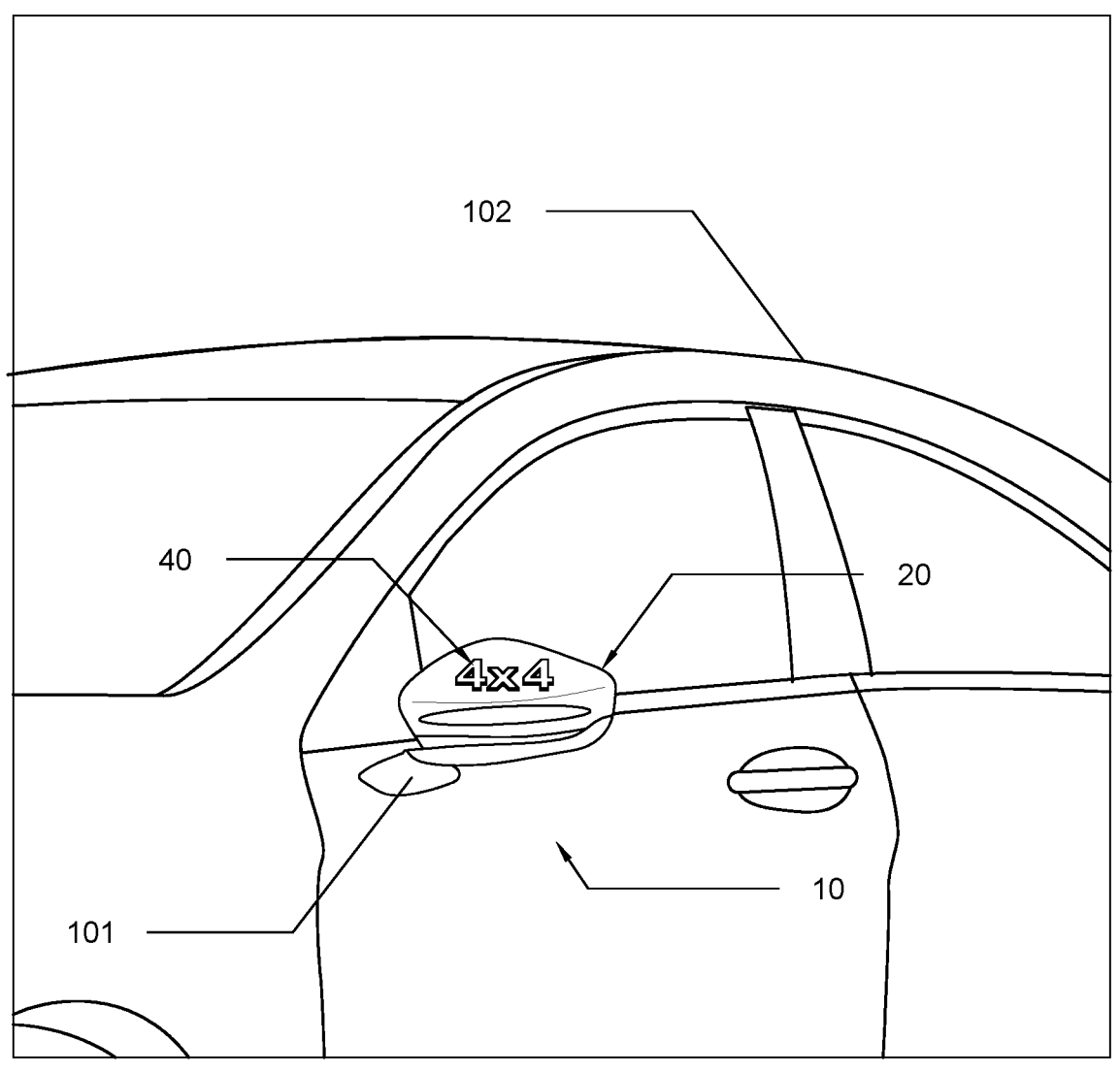
FIG. 1 represents an isometric operational view of the present invention 10 attached to a side mirror 101 of vehicle 102.
Figure 2:
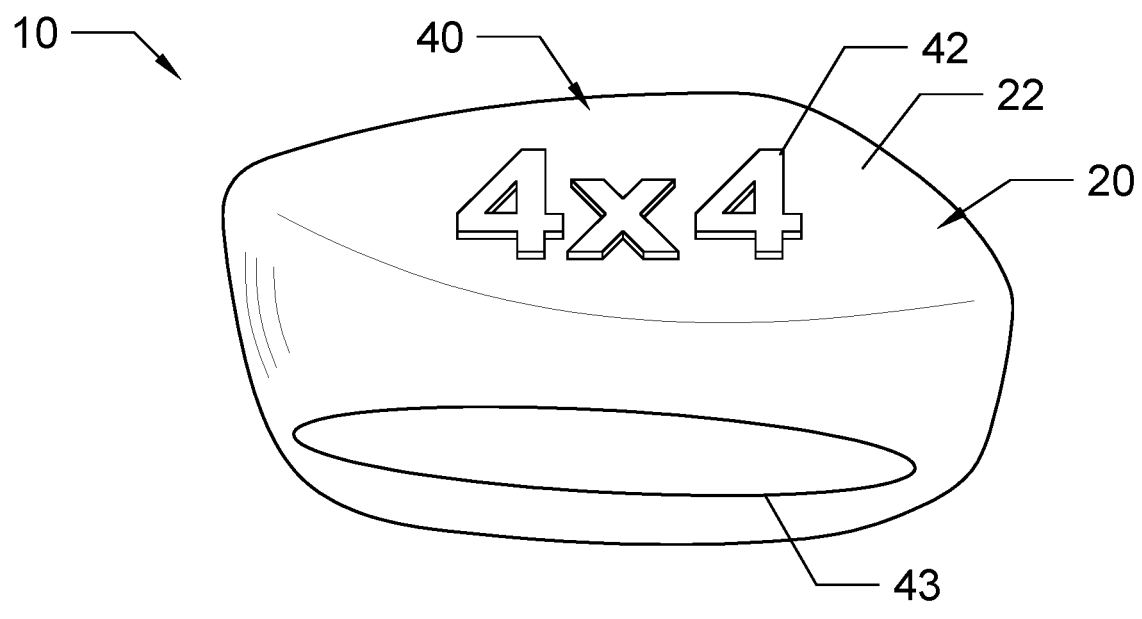
FIG. 2 shows an isometric view of the present invention 10, the present invention includes an enclosure assembly 20 and an indicia assembly 40.

Referring now to the drawings, where the present invention is generally referred to with numeral 10, it can be observed that it basically includes an enclosure assembly 20 and an indicia assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 3:
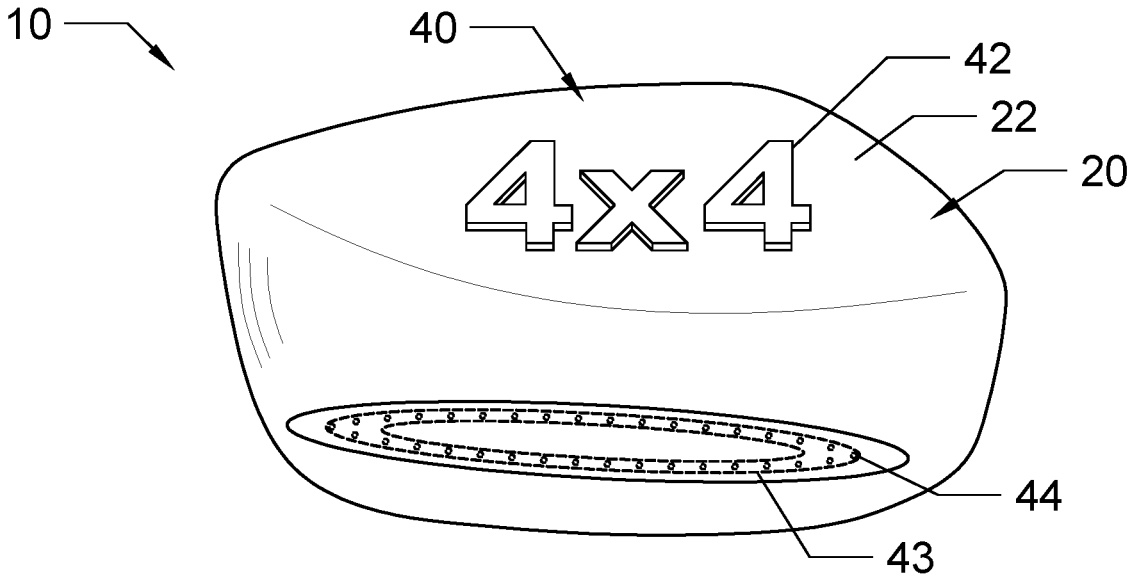
FIG. 3 illustrates a see-through view of the indicia assembly 40 showing light emitting diodes lights 44.
Figure 4:
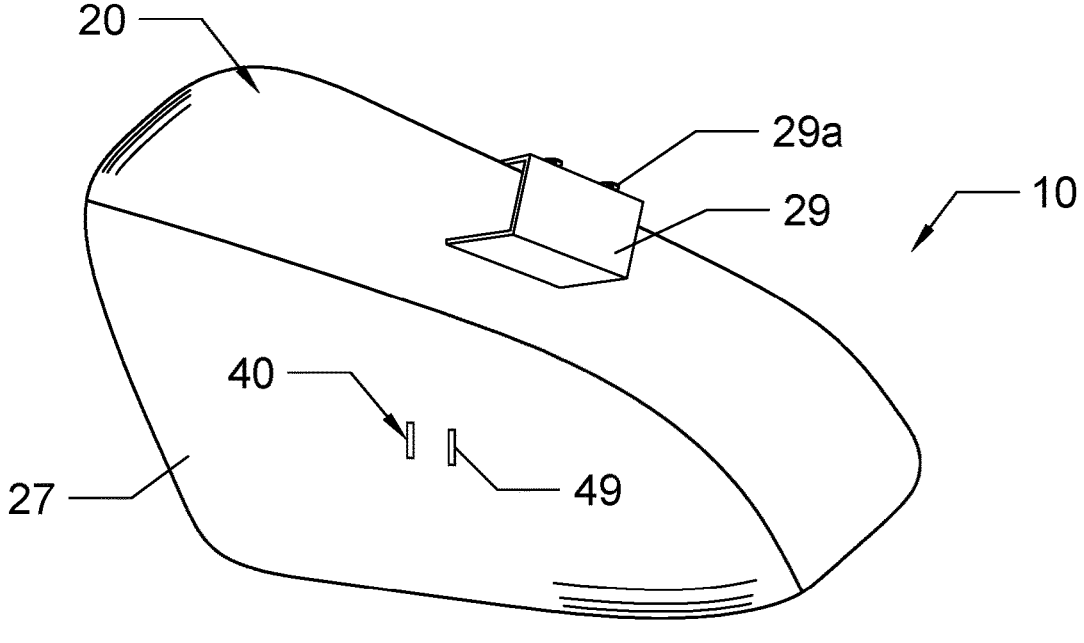
FIG. 4 is a representation of a rear perspective view of the present invention 10.

As best illustrated in FIG. 3 the enclosure assembly 20 may include an enclosure 22, an attaching element 29, and a rear portion 27. As best illustrated in FIG. 4 the enclosure 22 may include a front wall, a top wall, and a sidewall. The enclosure 22 may preferably be made of fiberglass with a. It also may be suitable for the enclosure 22 to be made of polyvinyl chloride, polyurethane, or any other resistant material. It may be suitable for the enclosure 22 to include aluminum or steel reinforcements extending along the surface thereof. The enclosure 22 may be placed over the side mirrors 101 of the car 102. The enclosure 22 may conform with the shape of side mirrors 101. In a preferred embodiment the sidewall and the rear wall of the enclosure 22 may have a curved shape extending along a perimeter of the front wall of the enclosure 22. The front wall of the enclosure 22 may substantially have a rectangular shape with rounded corners. It should be understood that the sidewall of the enclosure 22 may extend to the right or left side from the top wall of the enclosure 22. The enclosure 22 may be attached to either the right side mirror or left side mirror. For illustrative purposes in FIG. 4 the enclosure for a left side mirror is illustrated. Depending if the enclosure 22 is for a left side mirror or a light side mirror the top-right of the front wall or the top-left of the front wall may present a greater radius of curvature compared to the bottom-left and bottom-right of the front wall. The enclosure 22 may be attached to side mirrors 102 through the attaching element 29.

The attaching element 29 may preferably be made of polyvinyl chloride. It also may be suitable for the attaching element 29 to be made of polyurethane, fiberglass, aluminum, or any other suitable material. As best illustrated in FIG. 4 the attaching element 29 may have a top portion, a central portion and a bottom portion. The top portion may extend perpendicularly backwards from the top wall of the enclosure 22. The central portion of the attaching element 29 may extend downwards from the top portion. The rear portion of the attaching element 29 may extend perpendicularly backwards from a bottommost end of the central portion. The attaching element 29 may define an inverted-C shape. The attaching element 29 may extend from the top wall of the enclosure 22 to attach the enclosure 22 to the side mirror 101 of car 102. The attaching element 29 may include fasteners 29a. The fasteners 29a may be screws, nuts and bolts or any other fastener known in the prior art. The fasteners 29*a* may be inserted through the top portion of the attaching element 29 to secure the attaching element 29 to a top edge of side mirror 101.

Referring to FIG. 4 it can be observed that the rear portion 27 may be the rear portion of the enclosure 22. The rear portion 27 may include adhesive. The adhesive may be impregnated along the rear portion 27 to adhere the enclosure 22 over side mirror 101.

The indicia assembly 40 may include indicia member 42, sign 43, lights 44 and connector 49. As best illustrated in FIG. 3 the indicia member 42 may be located on the top wall of the enclosure 22. Indicia member 42 may be a solid element having an emblem, logo, phrase therein. The indicia member 42 may be located on a bottom portion of the front wall of the enclosure 22. The indicia member 42 may be made of glass, polyurethane or any suitable material. The indicia member 42 may be raised lettering.

The sign 43 may be located on a bottom portion of a front wall of the enclosure 22. The sign 43 may include an emblem which is illuminated by means of lights 44. In a preferred embodiment, lights 44 are light emitting diodes. Lights 44 may be arranged with sign 43 as illustrated in FIG. 3 where lights 44 are disposed in a circular arrangement. The lights 44 may be connected to a battery 103 of car 102. The lights 44 may be used as car turn signals and to illuminate the logo or emblem of sign 43.

Figure 3A:
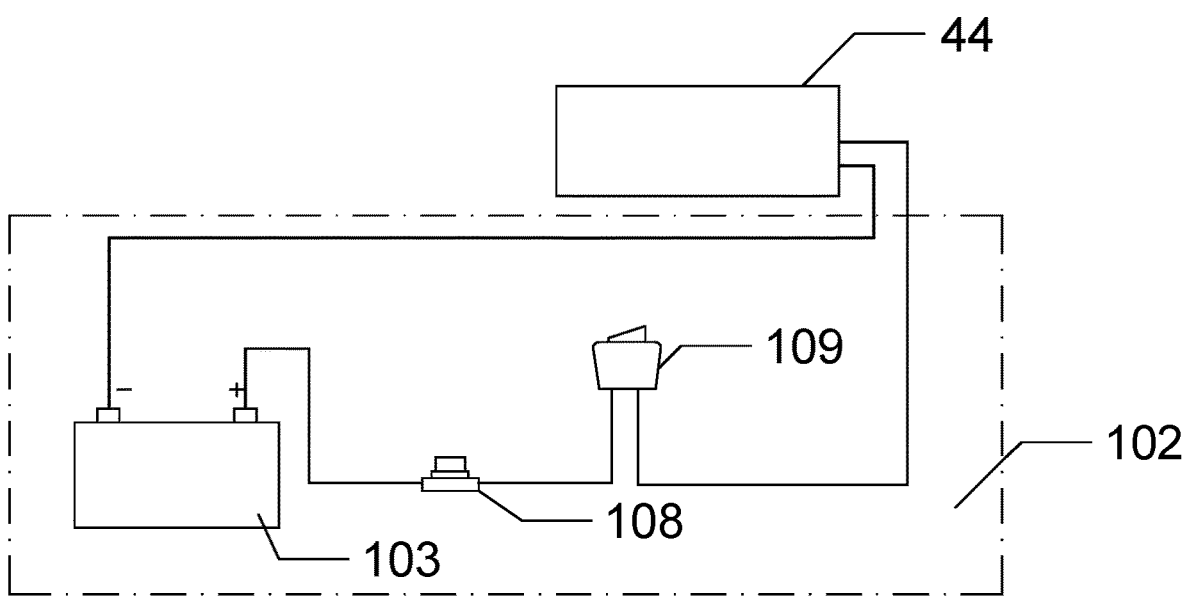
FIG. 3A depicts a schematic view of connection of led lights 44 to battery 103 of vehicle 102.

As best illustrated in FIG. 3A, the lights 44 may be electrically connected to the battery 103 by connecting the lights 44 to a switch 109, and the switch 109 to the fuse 108 of the vehicle. The connector 49 may be used to connect the lights to the battery 103. The lights 44 may be turned on to illuminate indicia 42. It also may be suitable for the lights 44 to be turned on predetermined patterns to be used as a blinker. Therefore, it may be suitable for the lights 44 to be connected to the control system of car 102.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An exterior vehicle mirror attachment with logo, comprising:
an enclosure assembly, wherein said enclosure assembly includes an enclosure, said enclosure is adapted to be attached to side mirrors of a car; wherein said enclosure includes an attaching element, said attaching element extends from a top wall of said enclosure, said attaching element is configured to attach said enclosure to said side mirrors; wherein said attaching element includes fasteners, wherein said fasteners go through said attaching element to fix said attaching element to said side mirrors; and
an indicia assembly, wherein said indicia assembly includes a sign member and lights, said sign member is built in said enclosure, said lights are within said sign member, said lights illuminate said sign member, said sign member includes an emblem or a logo.

2. The exterior vehicle mirror attachment with logo set forth in claim 1, wherein said enclosure includes a sidewall, a front wall and a top wall.

3. The exterior vehicle mirror attachment with logo set forth in claim 2, wherein said sidewall and said front wall have a curved shape extending about a perimeter of said front wall, wherein said front wall substantially has a curved shape with rounded corners.

4. The exterior vehicle mirror attachment with logo set forth in claim 1, wherein said enclosure includes a rear portion, wherein said rear portion includes adhesive, said adhesive is capable of being used to adhere said enclosure to said side mirrors.

5. The exterior vehicle mirror attachment with logo set forth in claim 1, wherein said attaching element includes a top portion, a central portion and a bottom portion, wherein said top portion extends perpendicularly backwards front said enclosure, said central portion extends perpendicularly downwards from said central portion and said bottom portion extends perpendicularly forward from a bottommost end of said central portion.

6. The exterior vehicle mirror attachment with logo set forth in claim 1, wherein said lights are connected to a battery of said car.

7. The exterior vehicle mirror attachment with logo set forth in claim 1, wherein said lights are light emitting diodes.

8. The exterior vehicle mirror attachment with logo set forth in claim 1, wherein said lights are connected to a control system of a car, said lights are capable of 16 being operated as blinkers.

9. The exterior vehicle mirror attachment with logo set forth in claim 1,
wherein said indicia assembly includes an indicia member, said indicia member is raised lettering.

10. An exterior vehicle mirror attachment with logo, consisting of:
an enclosure assembly, wherein said enclosure assembly includes an enclosure and an attaching element, said enclosure is adapted to be attached to side 27 mirrors of a car, wherein said enclosure includes a sidewall, a front wall and a top wall, wherein said sidewall and said front wall have a curved shape extending about a perimeter of said front wall, wherein said front wall substantially has a curved shape with rounded corners, wherein said enclosure includes a rear portion, wherein said rear portion includes adhesive, said adhesive is capable of being used to adhere said enclosure to said side mirrors, wherein said attaching element includes a top portion, a central portion and a bottom portion, wherein said top portion extends perpendicularly backwards front said enclosure, said central portion extends perpendicularly downwards from said central portion and said bottom portion extends perpendicularly forward from a bottommost end of said central portion, wherein said attaching element includes fasteners, wherein said fasteners go through said attaching element to fix said attaching element to said side mirrors; and
an indicia assembly, wherein said indicia assembly includes an indicia member, a sign member and lights, said sign member is built in said enclosure, said sign member is made of a transparent material, said lights are within said sign member, said lights illuminate said sign member, said indicia member includes an emblem or a logo, wherein said lights are connected to a battery of said car, said lights are light emitting diodes, said lights are connected to a control system of a car, said lights are capable of being operated as car turn signals, said indicia member is configured to turn on and turn off in coordination with turn signals of said car.

* * * * *